United States Patent
Myers

[11] Patent Number: 6,053,278
[45] Date of Patent: Apr. 25, 2000

[54] MULTIPLE USE CONVERTIBLE ELEVATED STAND AND CART

[76] Inventor: Timothy R. Myers, R D #5, Box 172, Punxsutawney, Pa. 15767

[21] Appl. No.: 09/158,557

[22] Filed: Sep. 22, 1998

[51] Int. Cl.⁷ ..................................................... E06C 7/16
[52] U.S. Cl. ............................................. 182/20; 182/116
[58] Field of Search ............................. 182/20, 116, 187, 182/206

[56] References Cited

U.S. PATENT DOCUMENTS

| | | | |
|---|---|---|---|
| 3,282,375 | 11/1966 | Ray | 182/20 X |
| 3,336,999 | 8/1967 | McSwain | 182/20 |
| 4,134,474 | 1/1979 | Stavenau et al. | 182/116 X |
| 4,552,246 | 11/1985 | Thomas | 182/116 |
| 4,552,247 | 11/1985 | Purdy | 182/116 |
| 5,064,020 | 11/1991 | Eagleson | 182/20 |
| 5,105,908 | 4/1992 | Freund | 182/20 |
| 5,242,030 | 9/1993 | Lobozzo | 182/187 |
| 5,253,732 | 10/1993 | Daniels | 182/116 |
| 5,275,257 | 1/1994 | Robertson | 182/116 |
| 5,279,390 | 1/1994 | Phillips | 182/187 |
| 5,282,520 | 2/1994 | Walker | 182/116 |
| 5,295,556 | 3/1994 | Mullin | 182/187 |
| 5,297,656 | 3/1994 | Amacker | 182/187 |
| 5,314,042 | 5/1994 | Adams | 182/187 |
| 5,363,941 | 11/1994 | Richard | 182/187 |
| 5,368,127 | 11/1994 | Phillips | 182/187 |
| 5,433,291 | 7/1995 | Shoestock, Sr. | 182/20 |
| 5,492,198 | 2/1996 | Williams | 182/187 X |
| 5,507,362 | 4/1996 | Krueger | 182/187 X |
| 5,566,780 | 10/1996 | Bambrough | 182/116 |
| 5,590,738 | 1/1997 | Hunt et al. | 182/187 X |
| 5,628,437 | 5/1997 | Kober | 182/20 X |
| 5,638,916 | 6/1997 | Schneider | 182/116 X |
| 5,791,436 | 8/1998 | Talley, Sr. | 182/187 X |

Primary Examiner—Daniel P. Stodola
Assistant Examiner—Hugh B. Thompson
Attorney, Agent, or Firm—Jacobson, Price, Holman & Stern, PLLC

[57] ABSTRACT

An elevated occupant supporting stand convertible to a wheeled cart capable of multiple uses and purposes. The stand includes a framework having a seat, footrest, safety railing and a structure for engaging a vertical support member such as a tree trunk, pole or the like. A sectional ladder is detachably connected to the framework and a stabilizer bar extends between a lower portion of the ladder and the support member to enable an occupant to climb the ladder to gain access to the framework, seat and related structure and enable an occupant to descend from the stand to ground surface. When used as a cart, an axle fixedly secured to the framework is provided with supporting wheels and the framework and disassembled ladder sections form a structure for supporting various items to be moved to and from a site of use of the stand with the ladder sections being secured together and forming projecting handles for manipulating the wheeled cart.

17 Claims, 8 Drawing Sheets

MULTIPLE USE CONVERTIBLE ELEVATED STAND AND CART

BACKGROUND OF THE INVENTION

1. Field of the Invention

The present invention generally relates to an elevated occupant supporting stand used for hunting or the like which is convertible to a wheeled cart capable of multiple uses and purposes. When used as an elevated stand, a framework including a seat, footrest and retaining side rails and front rail are in supporting engagement with a vertical support member such as a tree trunk, pole or the like. A sectional ladder and stabilizer bar between a lower portion of the ladder and the support member enables an occupant to climb the ladder to gain access to the stand and enables an occupant to descend from the stand to ground surface. When used as a cart, an axle fixedly secured to the framework is provided with supporting wheels, and the framework and disassembled ladder sections form a structure for supporting various items to be moved to and from a site of use, such as a killed carcass.

2. Description of the Prior Art

Portable elevated stands are well known for various uses including stands for use by hunters, photographers, observers of wild animals or for other observation purposes. Stands of this type usually include a structure for supporting the stand from a supporting member such as a tree trunk at an elevated position and includes a foldable or sectional ladder to provide occupant access to the stand. Also, stands of this type are usually of lightweight construction to enable easy handling and transport of the stand. It is also known to provide an elevated stand with a pair of wheels attached thereto to provide a cart capable of transporting game animals from a relatively inaccessible hunting area to a roadway, waiting vehicle or the like.

The following U.S. patents disclose various developments relating to elevated stands:

| | | |
|---|---|---|
| 3,282,375 | 5,253,732 | 5,368,127 |
| 4,134,474 | 5,279,390 | 5,433,291 |
| 4,552,246 | 5,282,520 | 5,492,198 |
| 4,552,247 | 5,295,556 | 5,566,780 |
| 5,105,908 | 5,314,042 | 5,590,738 |
| 5,242,030 | 5,363,941 | 5,791,436 |

The above listed prior art patents, however, do not disclose various unique structural features and use capabilities of the present invention including the particular structure of the framework, pivotal safety railing, attachment structure to a vertical supporting member, sectional ladder, stabilizer bar and the structure for mounting wheels to convert the stand to a cart.

SUMMARY OF THE INVENTION

The multiple use convertible elevated stand and cart of this invention includes a rigid framework for support against an upright support member and having a horizontal seat and a horizontal footrest oriented in vertically spaced relation that enables an occupant of the seat to engage his/her feet with the footrest. Attached to the framework is a safety rail pivotally connected to the framework and including vertical rear rails extending upwardly from each rear corner of the framework and then extending forwardly as side rails extending alongside an occupant of the seat. The forward ends of the side rails are connected by a front rail extending transversely in front of a seat occupant. A pivotal, telescopic brace supports the safety rail in an operative position and retains the safety rail rigidly in position to function to retain an occupant on the seat even when the occupant is utilizing a rifle or other firearm when hunting game, manipulating a camera for taking photographs of game animals or other objects from an elevated position. The framework includes an axle projecting from the rear bottom corners thereof for mounting supporting wheels and the front rear corners of the framework include rigid members forming an upper ladder section projecting downwardly from the forward corners of the footrest to form handles when the stand is converted to a cart for carrying game from a hunting site to a vehicle in a parking area. The framework includes a structure to secure the framework to a vertically disposed support member with the framework projecting laterally from the support member.

A sectional ladder is connected to the framework and includes telescopically connected sections formed by ladder rungs and side stiles. The stiles of the uppermost section of the ladder are connected to front rails of the stand framework and the stiles of the lowermost section of the ladder include tapered or pointed lower ends for insertion into the ground surface for stabilizing the ladder. A stabilizer bar is preferably longitudinally adjustable and universally pivotally connected to a ladder rung. The inner end of the stabilizer bar includes a structure for anchoring it to the vertical support member to further stabilize the ladder.

The framework includes pivotal retaining members preferably positioned just below the forward edge of the footrest for engaging and positioning the ladder sections on top of the elongated handles when the stand is converted to a cart. The ladder sections are retained in position preferably by the use of the structure which secures the stand to the vertical support member. The ends of the front rails of the framework which are horizontally disposed when used as a cart are preferably provided with caps of resilient material which facilitate gripping of the handles and also close the open ends of the handles to prevent entry of dirt or other debris in the event the ends of the handles are released and come into contact with the ground surface. The orientation of the handles, framework, axle and location of the wheels are such that the wheels are located generally in alignment with the center of gravity or the balance point of the cart for more effective control of the cart. The wheel size can vary and preferably is selected to provide easy rolling movement over uneven terrain and surface irregularities which may be encountered. Also, the free end portions of the handles when generally horizontally disposed are at an elevation similar to the elevation of the bed of a pickup trunk so that the handles may be positioned on an upper surface of the rear portion of a pickup truck bed or tailgate to facilitate the game animal being loaded onto the pickup truck.

An object of the present invention is to provide a multiple use elevated stand convertible to a wheeled cart which includes a rigid framework having a footrest and seat fixedly mounted thereon and a pivotally mounted occupant retaining safety railing oriented above the seat with the safety railing being pivoted to a compact relationship to the framework when the stand is converted to the wheeled cart.

Another object of the invention is to provide an elevated stand and cart as set forth in the preceding object in which the rear lower portion of the framework is provided with a permanently attached axle having end portions extending laterally beyond the framework for mounting wheels thereon to support the framework in a generally horizontal position with the safety railing collapsed and the seat and footrest being oriented vertically with cart handles being formed by end portions of the front rails of the framework which extend below the footrest when the framework is used as a stand.

A further object of the invention is to provide a convertible elevated stand and cart including a sectional ladder connected to the framework for providing access to the footrest, seat and safety railing with the sectional ladder including a stabilizer bar connected to a rung on an intermediate portion of the ladder for engaging a vertically disposed support member which is also engaged by a bracket assembly at the rear edge of the framework with both the bracket assembly and stabilizer bar being connected to the support member.

Still another object of the invention is to provide an elevated stand and ladder having ground penetrating lower ends to stabilize the ladder and stand when it is pivoted to an upright position with the stand being engaged with and secured to an upright support member such as a tree trunk when the elevated stand is to be used as a hunting stand, photography stand or other purposes.

Yet another object of the invention is to provide a multiple use elevated stand convertible to a cart including a sectional ladder constructed of telescopically connected segments which are mounted on an upper surface of forward frame rails of the framework when the framework is horizontally oriented and provided with supporting wheels to form a cart to support a game animal on the cart when transporting a game animal to a roadway or other area at which a pickup truck or other similar vehicle is parked.

Yet a further object of the present invention is to provide a stand and cart in accordance with the preceding objects which is rigid in construction and safe in operation, capable of being easily converted between use as an elevated stand and a load carrying cart, securely and quickly attached and detached in relation to an upright support such as a tree trunk, pole or the like and which enables an occupant of the stand to easily gain access to the stand, safely and securely occupy the stand and easily return back to the ground surface and enables quick and easy conversion of the stand to a cart.

Still yet another object of the present invention is to provide a convertible stand and cart in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming apart hereof, wherein like numerals refer to like parts throughout.

DESCRIPTION OF THE PREFERRED EMBODIMENT

Figure 1:
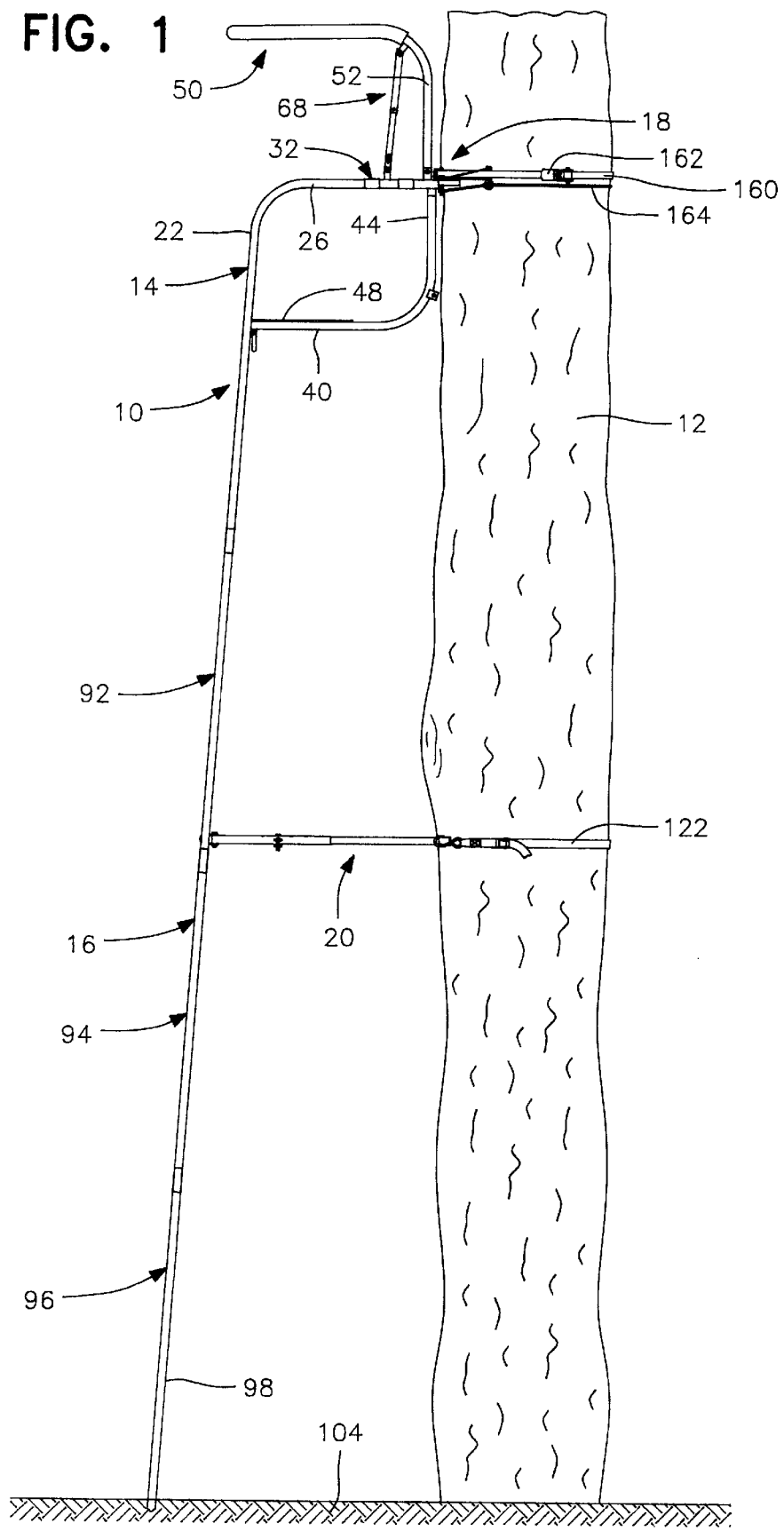
FIG. 1 is a side elevational view of the preferred multiple use elevated stand convertible to a cart in accordance with the present invention illustrating its use as a stand attached to a tree trunk.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 8:
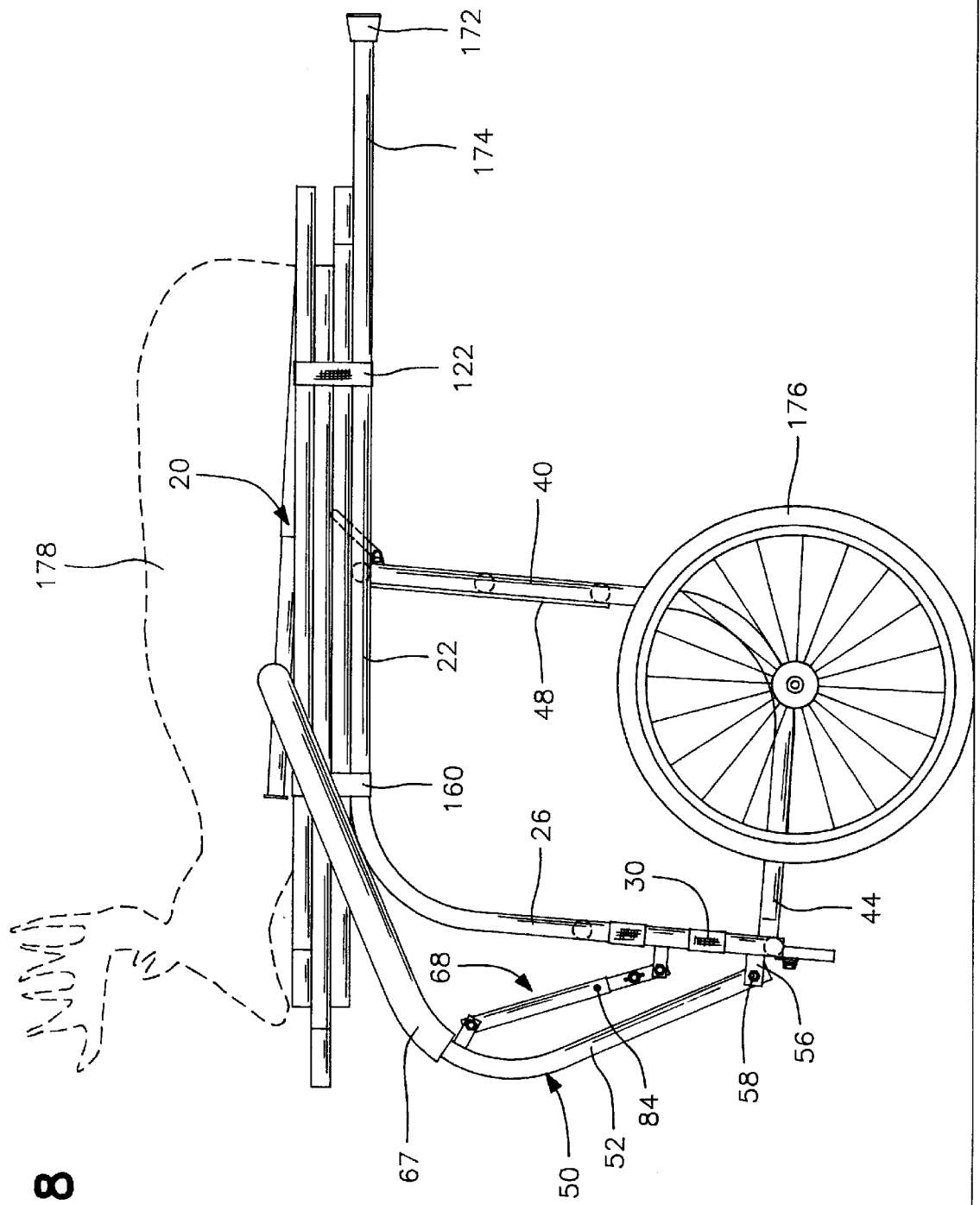
FIG. 8 is a side elevational view of the preferred embodiment of the present invention illustrating its use as a cart for transporting a game animal carcass or other load.

The multiple use elevated stand and convertible cart is generally designated by reference numeral 10 and, in FIG. 1, is illustrated when the stand is supported in elevated relation to a vertical support member 12 such as tree trunk, vertical pole or other vertical support structure in the nature of an elongated, rigid member. In FIG. 8, the convertible stand and cart 10 is illustrated when used as a cart and in FIG. 6, the convertible stand and cart 10 is illustrated in a compact, stored or transport condition.

Figure 2:
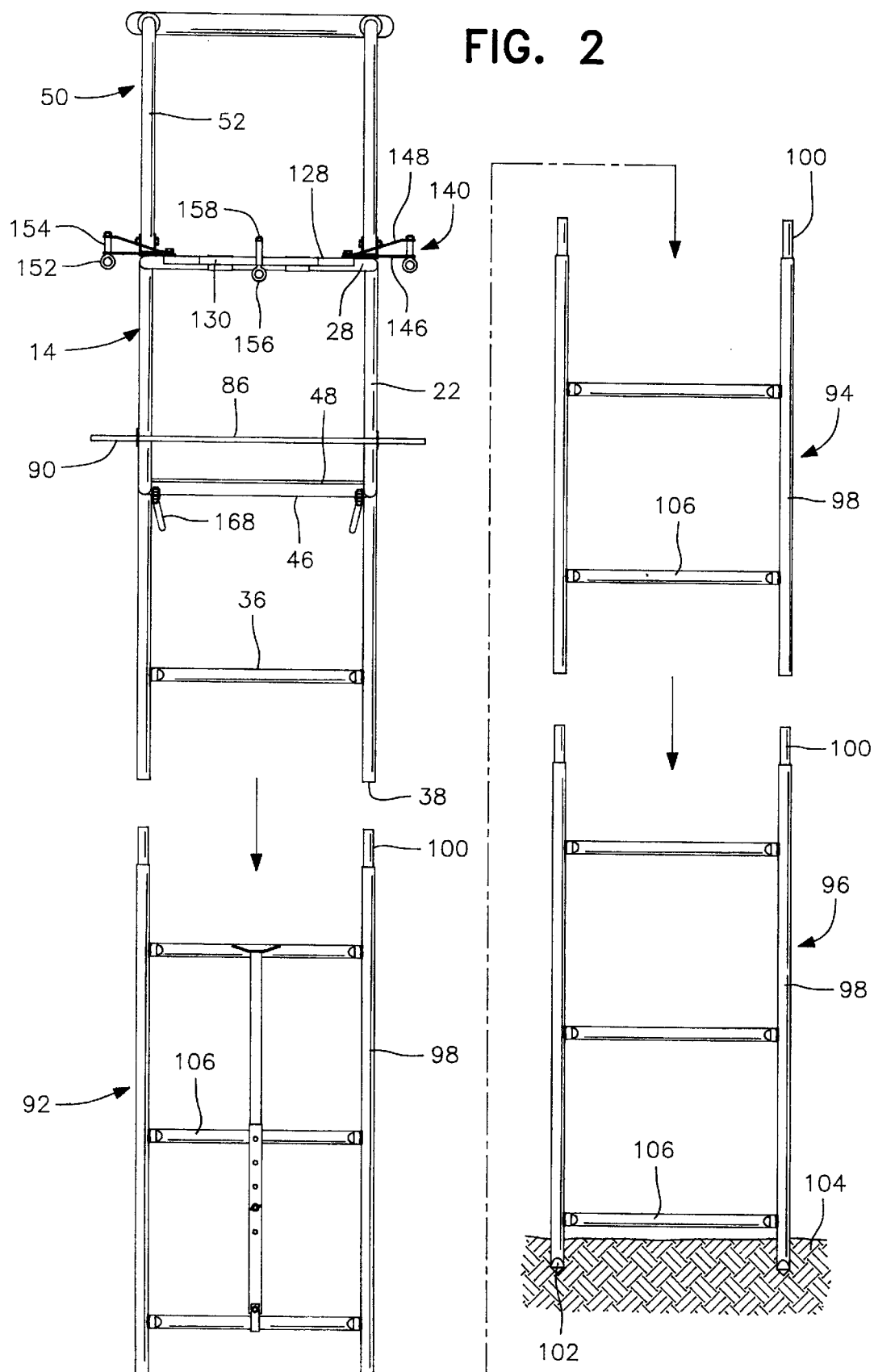
FIG. 2 is a rear elevational view of the assembly illustrated in FIG. 1 with the ladder sections being disconnected.

When used as an elevated stand such as a hunting stand, photographic stand or the like, the vertical support member 12 is in the form of a tree trunk having at least a substantial vertical portion which is free of tree branches or limbs projecting from the side of the tree trunk on which the stand is to be attached as illustrated in FIGS. 1 and 2.

The convertible stand and cart includes a rigid framework generally designated by the numeral 14 supported in elevated relation on the tree trunk 12 by a sectional ladder generally designated by the numeral 16. The framework includes a tree engaging support bracket generally designated by the numeral 18 and the sectional ladder 16 includes a stabilizer bar generally designated by the numeral 20 which engages the tree trunk at a point approximately at a midpoint of the combined total height of the sectional ladder.

Figure 3:
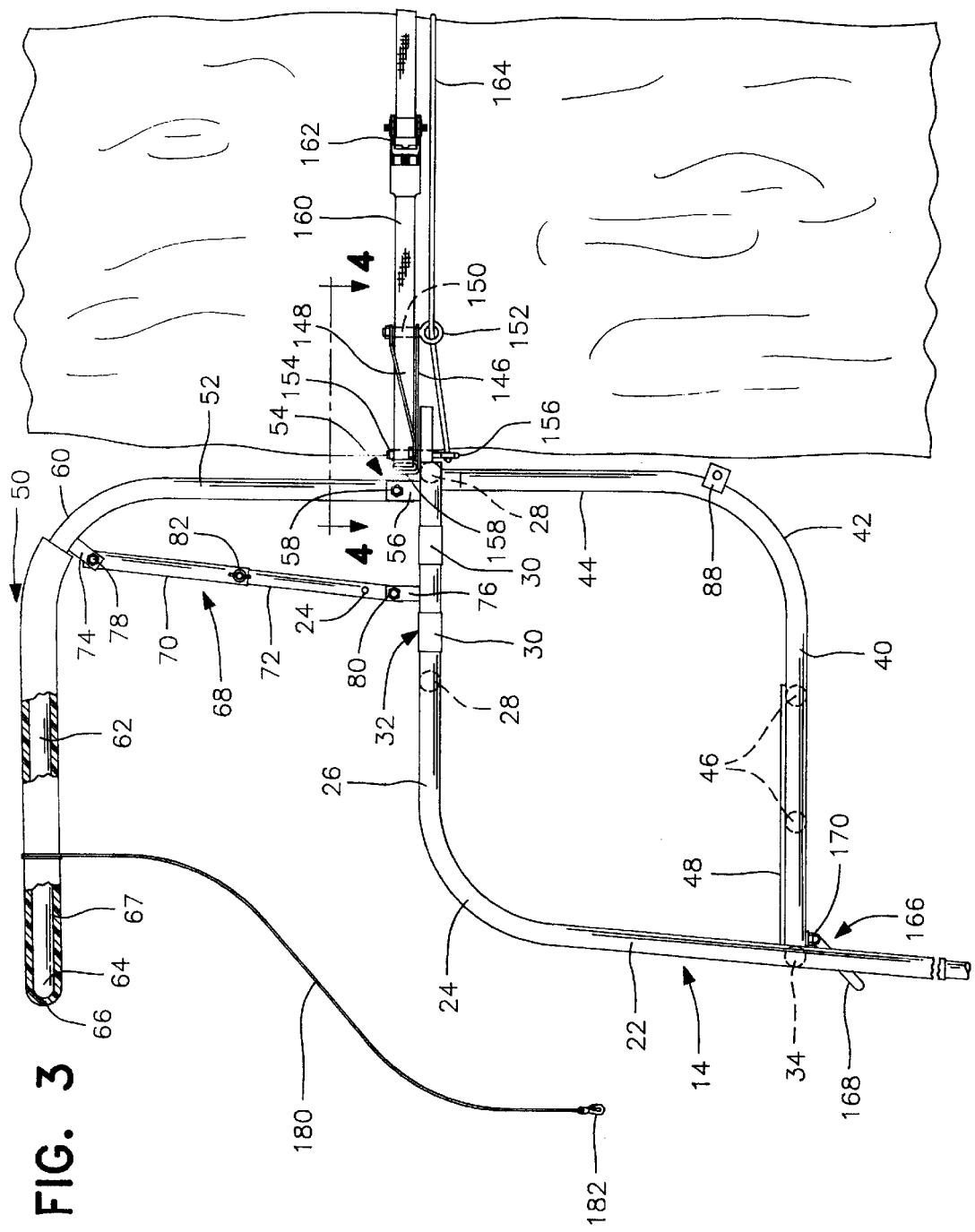
FIG. 3 is an enlarged side elevational view of the preferred elevated stand of FIG. 1 illustrating its structure and association with a tree trunk.

As illustrated in FIG. 3, the framework 14 includes a pair of laterally spaced, generally vertically disposed front rails 22 which are generally parallel to the tree trunk 12 but diverge slightly downwardly and outwardly. The upper end of each of the front rails 22 includes a generally right angle bend 24 and rearwardly extending top rails 26. The top rails 26 are interconnected rigidly by a pair of transverse rails 28 oriented in spaced parallel relation and rigidly affixed to the top rails 26, as by welding or the like, with the forwardmost transverse rail 28 being spaced rearwardly from the bend 24 and the rearmost transverse rail 28 being rigid with the rearward ends of the top rails 26. Webbing straps 30 interconnect the top rails 26 between the transverse rails 28 and similar webbing straps interconnect the transverse rails 28. The webbing straps are fixedly secured to the rails 26 and 28 and are interwoven to form an occupant seat generally designated by numeral 32. The front rails 22 are interconnected by a transverse rail 34 spaced below the bend 24. The lower ends of the front rails 22 include a transverse ladder rung 36 and terminate in downwardly facing tubular open ends 38 for connecting the sectional ladder 16 thereto in a manner described hereinafter.

The framework 14 also includes a pair of transversely spaced, generally horizontally disposed bottom rails 40 having their forward ends rigidly connected to the front rails 22 preferably in alignment and rigid with respect to the transverse frame rail 34. The rearward end of each bottom rail 40 includes a generally smoothly curved right angle bend 42 and upwardly extending rear rails 44 forming a continuation of the bend 42 as illustrated in FIG. 3. The upper ends of the rear rails 44 are rigidly connected to the rearward ends of the top rails 26 preferably at the juncture of the rear transverse rail 28 with the top rails 26. The bottom rails 40 are interconnected by a pair of spaced, parallel bottom transverse rails 46 spaced rearwardly from transverse rail 34. A footrest 48 is mounted on the rails 34, 40 and 46 with the footrest 48 extending across the top of the bottom rails 40 as illustrated in FIG. 3.

The framework 14 as described defines a generally rectangular or square rigid framework 14 which is open to the front and top with the seat 32 and footrest 48 being vertically spaced and oriented so that an occupant sitting on the seat 32 can comfortably position his/her feet on the footrest and easily move from the sectional ladder 16 onto the footrest and seat and easily move from the footrest and seat onto the sectional ladder thereby providing safe access between the ladder 16 and the footrest and seat. The rigid construction of the framework is maintained when the convertible stand and cart is used as a stand as illustrated in FIG. 3 and when the rear rails 44 and the front rails 22 are generally horizontally oriented for use as part of a cart as illustrated in FIG. 8.

Mounted on and above the framework 14 is a safety railing generally designated by the numeral 50 to enable an occupant to safely occupy the convertible stand and cart when used as a stand as illustrated in FIGS. 1 and 3. The safety railing 50 includes a pair of generally parallel, vertically extending rear legs or rails 52 which are transversely spaced apart a distance generally the same as the spacing between rear rails 44 of the framework 14. The lower ends of the rear rails 52 include a pivotal connection to the framework 14 generally designated by the numeral 54 which preferably includes a pair of upwardly facing U-shaped brackets 56 and a pivot bolt or other fastener 58 extending through the bracket and the lower end of a rail 52 received therein. The upper end of each of the rear rails 52 includes a generally 90° smoothly curved bend 60 which extends into a side rail 62 terminating in a 90° bend 64 at the forward end and a transverse front rail 66. The side rails 62 and the front rail 66 are preferably covered by a cushioning material 67 such as foam rubber, plastic or the like to render the safety railing more comfortable and enable various equipment, such as gun barrels, cameras and the like to rest against the side and front rails without damage to the equipment.

As illustrated in FIG. 3, the side rails 62 are generally parallel to the top rails 26 of the framework 14 but are somewhat longer in order to orient the side and front rails in relationship to an occupant to enable the occupant to move when manipulating a gun, camera or the like and still safely allow the occupant to remain seated on the seat or standing on the footrest. The vertical distance between the footrest 48 and the side rails 62 and front rail 66 should be at least waist high in relation to the occupant but not over shoulder height. The safety railing is maintained in operative position in relation to the seat 32 and footrest 48 by a safety railing support, generally designated by the numeral 68, which includes telescoping tubular members 70 and 72 extending between each of the top rails 26 of the framework 14 and the inner end of each of the side rails 62 at the bend 60. A U-shaped bracket 74 is connected to the side rails 62 adjacent the bend 60 and a U-shaped bracket 76 is attached to each top rail 26 between the transverse rear rails 28. The upper tubular member 70 is connected to bracket 74 by a pivot bolt 78 and the lower tubular member 72 which telescopes into the upper tubular member 70 is pivotally attached to the bracket 76 by a pivot bolt 80. The tubular members 70 and 72 are retained in their extended position for supporting the safety railing 50 in the position illustrated in FIG. 3 by a bolt 82 which extends through aligned apertures in the telescoped end portions of the tubular members 70 and 72. The bolt 82 can be stored in a transverse aperture 24 in the lower end of the tubular member 72 when the safety railing is to be collapsed to convert the stand to a cart or to a transport position by pivoting the safety railing 50 downwardly toward the framework 14 about the pivotal connection 54 with the pivoted collapsed position being illustrated in FIGS. 6 and 8.

In addition to the safety railing 50, the framework 14 is provided with a rigid transversely extending axle 86 (see FIG. 2) on the lower ends of the rear rails 44 adjacent the bend 42 with the axle 86 being rigidly affixed by brackets 88 welded to the rear rails 44 and welded to the axle 86. The axle extends laterally beyond the rear rails 44 with the extending portions of the axle being designated by reference numeral 90 for assembly of wheels as described hereinafter. The rigid axle 86 also serves to rigidify rails 40 and 44 in the area of bend 42, thus improving the strength of framework 14.

The sectional ladder 16 is connected to the open lower ends 38 of the front rails 22 of the framework 14 and preferably includes an upper section 92, a second or intermediate section 94 and a lower section 96. Each of the sections includes tubular stiles 98 having an upper reduced diameter section 100 which telescopes into the corresponding open lower end of a stile 98 in a manner to provide continuous stiles from the front rails 22 to the lowermost ends of the stiles which are crimped at 102 for penetration into the ground surface 104. As illustrated, the upper ladder section 92 includes three ladder rungs 106, the second ladder section 94 includes two ladder rungs 106 and the third or lower ladder section 96 includes three ladder rungs 106. All of the ladder rungs are equally spaced in relation to each other when the ladder sections are assembled. The crimped lower ends 102 of the stiles 98 enable the stiles 98 on the lower ladder section 96 to easily penetrate into the ground surface until the ladder rung 106 adjacent the lower end of ladder section 96 engages the ground surface 104 for stability of the sectional ladder. The total length of the sectional ladder may be varied by omitting the second ladder section or using the second ladder section depending upon the necessities of the tree height and desires of the user.

Figure 5:
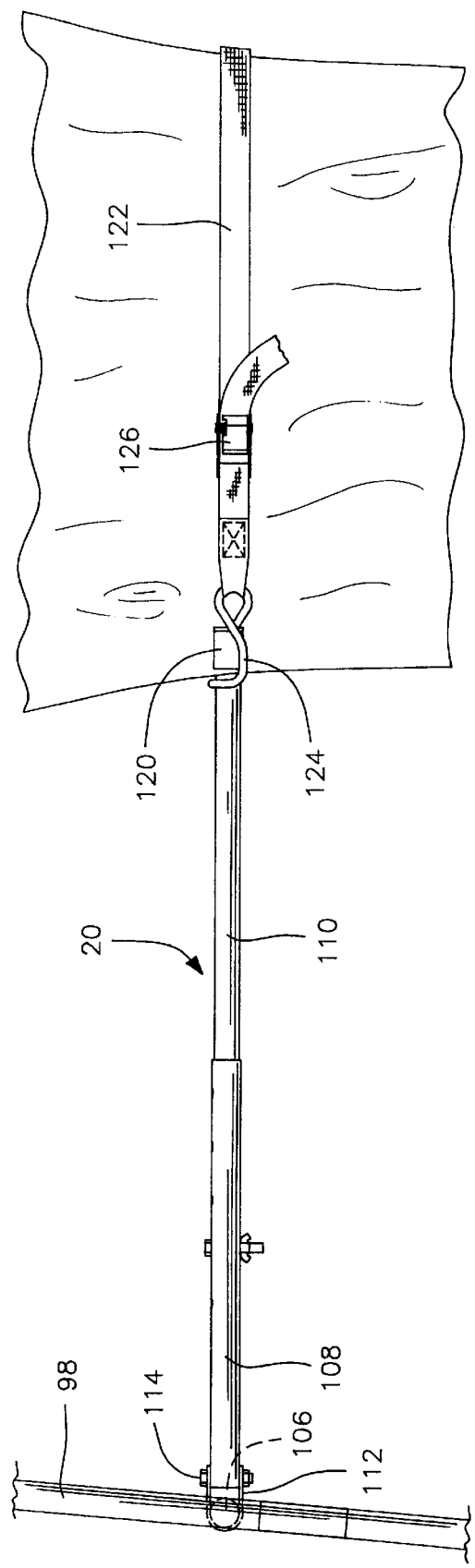
FIG. 5 is an enlarged elevational view of the stabilizer bar of the FIG. 1 embodiment illustrating its structure and association with a tree trunk.
Figure 7:
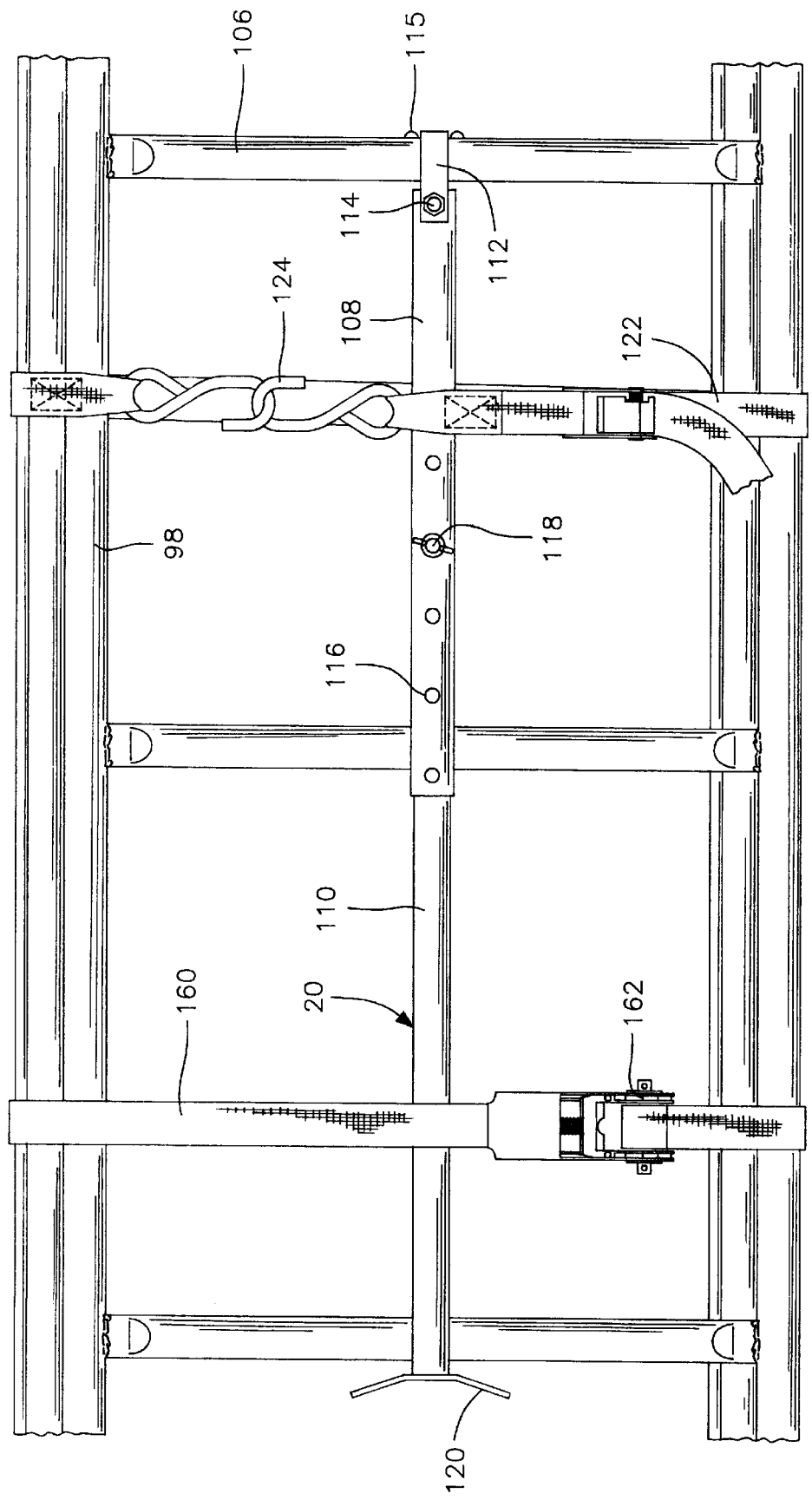
FIG. 7 is a fragmental plan view illustrating the manner in which the ladder segments are secured in place on the framework in the configuration of FIG. 6.

As shown in FIG. 5, the stabilizer bar 20 includes a larger diameter tubular member 108 telescopically receiving a smaller diameter tubular member 110 which are telescopically related for adjustment in length. The outer end of the tubular member 108 is connected to the lowest ladder rung 106 on upper ladder section 92 by a generally U-shaped bracket 112 partially encircling rung 106 and a pivot bolt 114 which enables the stabilizer bar to be angulated about a generally vertical axis to orient the stabilizer bar 20 in optimum angular relation to the tree trunk 12. The U-shaped bracket 112 is rotatably connected to the ladder rung 106 by virtue of its curvature being generally equal to the diameter of the ladder rung 106. Lateral movement of the bracket 112 on rung 106 is prevented by a pair of small projections 115 adjacent the center of the ladder rung 106 (see FIG. 7). The projections 115 engage the side edges of the bracket 112 to enable the bracket 112 to rotate around the rung 106 but prevent lateral movement of the bracket 112 on the ladder rung 106. This structure enables the stabilizer bar 20 to swing in a vertical plane about an axis defined by the ladder rung 106 to orient the stabilize bar in optimum vertical relation to the tree trunk 12.

The tubular member 108 is provided with a plurality of longitudinally spaced apertures 116 to receive a bolt 118 which enable the longitudinal length of the stabilizer bar to be adjusted with the bolt 118 securing the stabilizer bar securely in a longitudinally adjusted position. The inner end of the stabilizer bar 20 is provided with a generally U-shaped saddle 120 in which the end portions of the saddle are generally straight but angulated to engage the periphery of the tree trunk 12 at circumferentially spaced points and enabling effective engagement with tree trunks of various sizes. This structure enables the stabilizer bar to be pivoted up or down and left or right horizontally and the predetermined adjustable length allows utilization with a wide variety of trees or other support members. The tree engaging saddle 120 is held to the tree trunk 12 by a webbing strap 122 of nylon or the like. The strap 122 has end hooks 124 or other connecting structure connecting the strap to the stabilizer bar 20 by hooking the hooks 124 over the tubular member 110 at its juncture with saddle 120. A cam lock adjustment 126 is preferably provided for tightening the strap 122 around the tree trunk 12 without damage to the tree.

Figure 4:
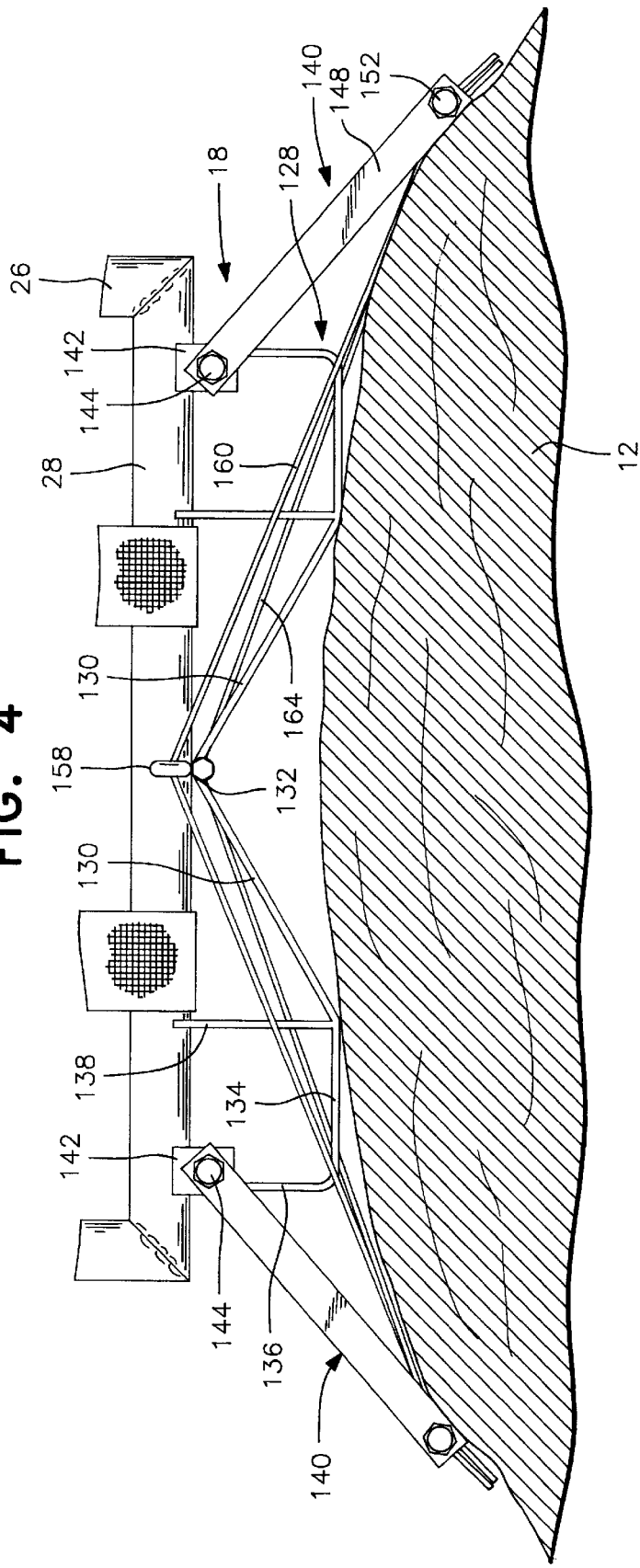
FIG. 4 is a transverse sectional view taken along section line 4—4 on FIG. 3 illustrating details of the structure which secures the elevated stand to a tree.

The support bracket 18 which connects the framework 14 to the tree trunk 12 is preferably mounted on the rear transverse rail 28 and includes a tree engaging saddle generally designated by the numeral 128 rigidly affixed to the rear transverse rail 28. The saddle 128 includes a pair of rigid members 130 in the form of metal bars or straps having their inner ends anchored at 132 to the central portion of the transverse rail 28 and extending outwardly therefrom in angular diverging relation. The outer end portions of the rigid members 130 each terminate in a straight outwardly extending member 134 in the form of a continuation of the rigid members 130. The outer terminal end of each member 134 is connected to a rigid bar or strap member 136 extending back to and attached to the transverse rail 28 in spaced relation to point 132. A reinforcing strap or bar 138 extends from the juncture between the inclined member 130 and the straight member 134 to the rail 28 as illustrated in FIG. 4 thus providing a wide angled, shallow V-shaped bracket which engages the periphery of the tree trunk 12 at circumferentially spaced points. By this construction, the shallow V-shaped configuration enables stable engagement of the saddle 128 with tree trunks of different diameters and configurations.

The tree bracket 18 additionally includes a pair of tree bracket arms 140 which are pivotally connected to brackets 142 rigidly affixed to the transverse rail 28 at its juncture with the member 136 by a pivot bolt 144. This pivotal connection enables the free end of the tree bracket arms 140 to swing in a horizontal plane about the vertical axis defined by the bolt 144. Each of the arms 140 includes a lower member 146 and an upper member 148 in the form of rigid straps or bars of metal which are connected or superimposed under the bolt head of the bolt 144 with the lower member 146 being straight and the upper member 148 diverging upwardly. A sleeve 150 rigidly interconnects the outer ends of the straps or bar members 146 and 148. An eye bolt 152 extends through the sleeve 150 and is secured thereto with the eye of the eye bolt being oriented at the bottom of the outer end of the lower member 146. The plane of the eye of the eye bolt is preferably aligned with the centerline of the lower member 146. The pivotal movement of the arms 140 enables the outer ends thereof to be moved inwardly and outwardly into engagement with a tree trunk at points spaced circumferentially from the points of engagement of the saddle 128 with the tree trunk 12.

A vertical sleeve 154 is rigidly affixed to the interior juncture of the members 130 where they connect with the transverse rail 28. An eye bolt 156 extends through the sleeve 154 and depends below the rail 28 with the vertical plane of the eye of the eye bolt 156 generally paralleling the rail 28. The eyes of the eye bolts 152 on the pivotal arms 140 are oriented generally in the same horizontal plane as the eye bolt 156. The sleeve 154 extends above the members 130 and the transverse rail 28 and includes a vertically disposed loop 158. Loop 158 extends toward the transverse rail 28 and is oriented above the rearward edge portion of the rail 28 with the vertical plane of loop 158 being perpendicular to sleeve 154 and rail 28. The loop 158 and the sleeves 150 on the outer ends of the arms 140 are generally in the same horizontal plane and receive a web strap 160 therethrough as illustrated in FIG. 3. A rachet mechanism 162 is preferably connected to the ends of the strap 160 in a manner which enables the strap 160 to be tightened about the tree trunk 12. As illustrated in FIGS. 3 and 4, the strap 160 extends through the loop 158 and between the outer ends of the upper and lower members 146 and 148 which form the arms 140 and around the outer surface of the sleeves 150 thus pulling the outer ends of the arms 140 against the tree trunk 12 when the strap 160 is tightened by the rachet 162. This also pulls the framework 14 toward the tree trunk 12 thus tightly engaging the diverging surfaces of the members 130 with the tree trunk at circumferentially spaced points which are spaced circumferentially from the points of engagement of the arms 140 with the tree trunk thereby securely anchoring the framework 14 to the tree trunk 12.

A safety rope 164 is also associated with the tree bracket 18 and includes a central portion which is extended through the depending eye bolt 156. Two end portions of the safety rope 164 extend outwardly from the eye bolt 156 and through the eye bolts 152 mounted below the outer ends of the tree engaging arms 140. The safety rope 164 can then be wrapped around the tree trunk 12 and tied, or it can be crossed around the tree trunk in opposed relation to the framework and then wrapped back around the tree trunk to be anchored to a lower portion of the framework such as around the lower ends of the rear rails 44 below the axle 86.

Figure 6:
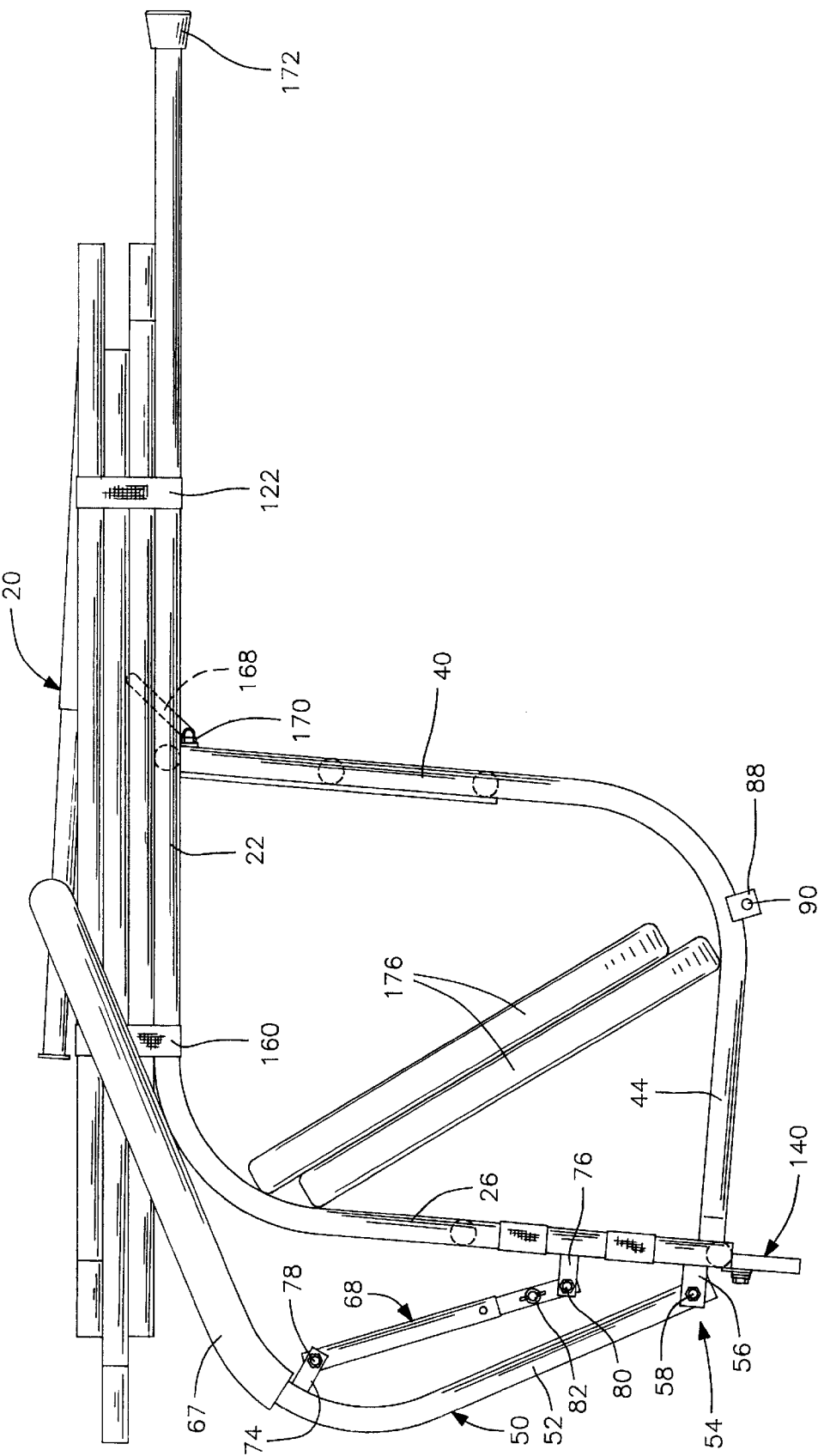
FIG. 6 is a side elevational view of the stand, ladder segments and wheels of the preferred embodiment of the present invention shown in a stored position.

The juncture between the front rails 22 and the bottom rails 40 includes a pivotal support generally designated by numeral 166. Pivotal support 166 is preferably in the form of a short rod 168 pivoted for movement about a generally vertical axis from a bracket 170 welded to the inner surface of the transverse frame rail 34 so that it can be swung from a position underlying the footrest 48 to a position extending outwardly and downwardly in front of the front frame rails 22. When positioned in front of the front frame rails 22, the rods 168 serve to engage and retain the ladder sections when the convertible stand and cart is converted to a stored condition as shown in FIG. 6 or to the cart condition as shown in FIG. 8. The rods 168 prevent forward sliding movement of the ladder sections in relation to the front rails 22 of the framework 14 by engaging the rungs 106 of the ladder section when they are stacked on the rails 22 when oriented in a horizontal position as illustrated in FIGS. 6 and 8.

When the stand is converted to a stored condition or when converting the stand to a cart, the bolt 82 of the safety railing support 68 is removed and stored in the aperture 84 so that the tubular members 70 and 72 can telescope as the safety railing 50 is pivoted downwardly about the pivotal connection 54 to the position illustrated in FIGS. 6 and 8. In this position, the front rail 66 is also overlying the ladder sections. The ladder sections are retained in place by the straps 122 and 160 which are removed when the framework is detached from the tree trunk. Also, caps 172 are provided for the tubular open ends 38 of the front rails 22 to prevent entry of dirt or debris into the ends of the front rails 22 and also facilitate gripping of the ends of the rails 22 when using the rails 22 as handles 174. As illustrated in FIG. 8, wheels 176 are mounted on the ends 90 of the axle 86 and are retained thereon by transverse pins or the like to facilitate transport of a game animal 178 to a waiting vehicle on a roadway or other parking area. Preferably, the height of the handles is approximately the height of the bed of a pickup truck so that the tailgate of the pickup truck can be lowered and the handles 174 placed thereon to facilitate movement of the game animal 178 onto the load bed of a pickup truck.

To facilitate lifting and lowering guns, bows and arrows, cameras or other equipment, a lift rope 180 can be anchored at one end to safety railing 50 such as at one of the side rails 62. The rope 180 may be provided with a snap hook 182 or other attaching structure at the other end thereof to enable various items to be lifted or lowered without climbing up or down the ladder 16 while carrying such items. The cart can also be provided with a hitch at a convenient location to enable the cart to be connected to an all terrain vehicle where it is feasible to utilize such a vehicle or any other powered vehicle. Additionally, skis may be attached to the wheels in a manner to enable the skis to be utilized in moving the cart along snow covered surfaces.

Primarily, the present invention is a multiple use hunting stand, game or equipment carrier, and a wild life photography station, consisting of ladder sections and an uppermost section referred to as the stand that is convertible to a cart section. The sections of ladder connect to each other and are then connected to the stand to provide the user with a safe elevated and confined area from which to hunt or photograph wild life. When converted to a cart, the invention is also used as a game carrier or equipment cart to move photography equipment or game animals to or from a location.

This invention provides the older mature photographer or hunter with a safe alternative to physically carrying photography equipment and physically dragging game animals. This invention allows the moving of game animals and equipment to or from a location with a minimal amount of physical effort.

For the hunter, loading game animals such as deer or bear onto the average pickup truck can be a physical challenge. This invention allows the user to simply lower the pickup truck tailgate and pull the handle end of the cart, with the game animal on it, over the tailgate and slide the game animal onto the pickup truck bed, eliminating the need to physically lift the game animal up to the height of the pickup truck bed.

As a hunting stand or photography station, the structure is designed with the utmost in safety and portability for the user and is designed to confine them while actually on it to prevent a possible fall. This is done by the safety railing which projects forward at a predetermined height and extends over the top of the ladder to prevent the user from stepping forward of the footrest and seat area. The safety railing also serves as a rest from which a rifle hunter can utilize for a steady shot. For the archery hunter, the safety railing serves as a rest to lean against when they draw their bow. For the photographer, the safety railing can be utilized as a device from which to mount cameras for steady clear photos or video.

The footrest area is constructed by welding nonslip steel grating over the framework of its perimeter to provide solid sure footing. The seat area is constructed by riveting nylon webbing in a crisscross pattern to the framework of its perimeter.

When the user is actually on the elevated stand or photography station, they have a full range of movement and can survey the area a full 360 degrees and they can sit or stand as they prefer.

The bottom ladder section is constructed so the lowermost portions of the side rails or stiles of the ladder have the hollow ends crimped tightly closed. This serves two functions, dirt, mud and other debris is prevented from plugging the ladder and the crimps act like a blade to inject the ladder section into the ground until it rests on the lowermost ladder rung to prevent the entire unit from moving to or from the base of the tree.

The adjustable length stabilizer bar extends from the approximate mid-point of the combined total height of the ladder from the center point of the lowest ladder rung on the upper ladder section to the tree. The stabilizer bar can be moved up or down and left or right horizontally. The predetermined adjustable length allows the utilization on a wide variety of trees for a broad overall use of the stand. The end of the stabilizer bar rests on the tree and is held to the tree by a cam lever nylon strap to avoid damage to the tree thus creating a solid link from the ladder to the tree. The length of the stabilizer bar is adjustable to compensate for the degree of lean from vertical a particular tree may have. Its purpose is to add stability to the overall ladder assembly and increase the weight capacity of the tree stand without deviation from the predetermined plane of the seat and footrest area.

The topmost portion of the tree stand is safely and securely held to the tree without causing damage to the tree. This can be achieved safely from the ground level simply by taking hold of one end of the preattached rope 164 and walking around the back side of the tree while keeping it taut and securing it to the ladder rung and the ladder stile at the outside of the ladder on the same ladder rung to which the stabilizer bar 20 is attached. The other end of the rope 164 is secured in the same manner only reversing the procedure to the opposite side. The two ends of rope 164 now crisscross each other around the back side of the tree and connect to the ladder and prevent the topmost portion of the tree stand from slipping off the tree during the initial climb.

The tree bracket 18 for the uppermost portion of the tree stand permits contact with the tree without causing damage to the tree. This eliminates rocking back and forth around the circumference of the tree which is a common problem with tree stands. It virtually eliminates the problem of rocking and provides a solid connection of the tree stand to the tree. The tree bracket uses two arms located one on each opposite side to create a hugging affect. As described previously, each arm is pulled inward toward the tree from opposite directions forcing the tree trunk to be pulled into the V-notch in the center of the tree bracket. After the user makes his/her initial climb, a nylon ratchet strap is attached beginning at a point from the back side of the tree. The free end is fed through the end of one arm, to and through the post ring located at the center of the V-notch on the tree bracket, to and through the end of the opposite arm and then is connected to the remaining end of the ratchet mechanism. The strap is then ratcheted tight to create the final anchoring point.

The simplicity of the invention makes it very easy to use. The wheels can be removed by removing a hitch pin at the end of the axle. The three ladder sections and the cart section simply slide together to form the tree stand. There are only three bolts and wingnuts that need attention for the entire assembly of the tree stand. One bolt and wingnut on each of the two safety railing supports and the adjusting bolt and wingnut to adjust the length of the stabilizer bar. The entire assembly process takes a very short time from cart to tree stand. A gear retriever rope is attached to the safety railing to attach weapons and equipment so they can be raised and lowered safely from the top of the tree stand eliminating the need to carry things while climbing up or down the ladder at the same time. The rope hangs down from the safety railing to within four feet from the ground so weapons and equipment can be attached from the ground and removed from the ground. Traction grit is installed on the ladder rungs to provide sure footing. The two ladder hangers pivotally mounted under the footrest swing out to form holding points to stack the three ladder sections onto the front rails for transport. The three ladder sections are additionally held in place with the ratchet strap and cam lever strap which both go around the three ladder sections and the front rails to hold them firmly to the cart.

The front rails are a continuation of the ladder, bent at an approximate 86 degree angle with an additional rung placed at the end and another located to form a footrest area. Two primary footrest supports that are bent at an approximate 90 degree angle at an exact location are welded in position one on each side of the ladder. One end of the primary footrest supports goes from the rear of the seat area to the front side of the ladder at the location of the uppermost climbing rung to form the primary footrest support frame. Two additional supports are then welded in position from one of the primary footrest supports to the other, one is positioned to form the rear of the footrest area and the other as a mid-support for the footrest area and is located mid-way between the uppermost climbing ladder rung and the rear of the footrest area. The framework of the footrest area is then overlaid with non-slip grating welded along its perimeter to include the topmost climbing ladder rung which now serves as the front support for the footrest. Additionally, the wheel axle is welded in a structurally critical position as support across the two bent primary footrest supports with equal length ends protruding on each side of the primary footrest supports.

The safety railing is formed by beginning at a critical point and bending the tubing at a 90 degree angle then moving to the next critical point and bending another 90 degree angle, then moving to still another critical point and bending at approximate 15 degree angle, then moving to the same location on the opposite side and bending the another approximate 15 degree angle. The combination of the two 90 degree bends and the two 15 degree bends form an approximate U-shaped configuration. Then at a critical point another 90 degree bend is made 180 degrees from the plane in which the four previous bends were made. Then at the same point on the opposite side a similar 90 degree angle is bent to form the two legs of the safety railing.

Four preformed basically U-shaped brackets are then welded at predetermined locations, two of which are welded in position on each side at the rear of the seat area and the remaining two are welded forward from the previous two at the approximate mid-seat location. The rear brackets serve as an attachment point for the safety railing itself. The front two brackets serve as the attachment point for the hinge assembly that enables the safety railing to have pivotal movement and can be locked in the raised position. Each of the two safety railing supports are formed by an inner and outer tube. This enables the inner tube to slide within the outer tube to expand its length when the safety railing is raised to its predetermined height. Equally the tube will slide in the opposite direction or shorten when the safety railing is lowered. The safety railing is locked in the raised position by a bolt through both the inner and outer tubes, one on each side of the safety railing. Further, the smaller diameter tube is bolted to the previously mounted U-shaped bracket welded in position at the mid-seat location. The larger diameter tube is then bolted to the U-shaped bracket that is welded to the underside of the safety railing at a location that corresponds to the predetermined height of the safety railing and the length of the safety railing support when it is in its locked position. The same procedure is then carried out for the opposite side.

The tree bracket is made by bending a length of strap to stand away from the rear of the seat area to contain a V-notch at the center to accept a large variety of tree sizes. Also, two shorter standout braces are added at the ends of the V-notch itself extend to the same line of the outside ends of the configuration and is then welded to the rear of the seat area on a horizontal plane with the seat. Two arms are then formed from the same material each with one straight side and one slightly curved side to form a wishbone shape. A round bushing equal in length to the width of the arm is then secured through the arm end by an eye type bolt with the nut riveted on to prevent removal. Two arm end brackets are then formed to hold the ends of each arm securely to the tree stand itself and welded in position to include the V-notch configuration and the rung located at the rear of the seat area. The closed end of each of the two arms is then bolted to their respective brackets with the nut riveted to prevent removal. Additionally a post ring is formed by bending a length of strap once again to a U-shaped and is then welded to include the center of the V-notch configuration and the rung located at the rear of the seat area. To conclude the forming of the tree bracket assembly, an additional eye type bolt is installed at the center of the V-notch and located through the rung located at the rear of the seat area with the nut riveted on to prevent removal.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A multiple use elevated stand and cart comprising a framework, a seat rigidly mounted on said framework, a footrest rigidly mounted on said framework below said seat, a sectional ladder connected to said framework below said footrest, a safety railing supported from said framework above said seat, said framework including a supporting structure adapted to be connected to a generally upright support to orient the seat and footrest in generally horizontal positions, said safety railing including a front rail and a pair of side rails spaced above said seat, said front rail being generally parallel to the seat and oriented forwardly of a front edge of said seat to prevent a seat occupant from moving forwardly from the seat, said safety railing being pivotally connected to said framework for pivotal movement about an axis transverse of said framework to enable folding into compact relation to said framework and seat, a brace interconnecting said pivotal safety railing and said seat to maintain the safety railing in operative relationship to the seat and to enable the safety railing to pivot to a position adjacent the seat, said ladder being detachably connected to said framework for positioning sections of the ladder in knock down relation.

2. The stand as defined in claim 1, wherein said supporting structure includes a bracket on a rearward edge portion of said framework, said bracket adapted to be connected to the generally upright support and a stabilizer bar connected to said ladder at a location below said footrest, said stabilizer bar adapted to engage the generally upright support at a location below said bracket on the rearward edge of the framework.

3. The stand as defined in claim 2, wherein said bracket on the rearward edge portion of said frame includes a pair of laterally spaced and rearwardly extending pivotal arms adapted to engage a surface on the generally upright support at circumferentially spaced points.

4. The stand as defined in claim 3, wherein said bracket on the rearward edge portion of said framework includes a saddle rigidly affixed to the rearward edge of the framework and including a pair of diverging members adapted to engage a tree trunk at circumferentially spaced points, said pivotal arms extending beyond the points of engagement of the diverging members with the tree trunk and adapted to engage the tree trunk at circumferentially spaced areas circumferentially outwardly of the diverging members, a flexible strap connected to said framework and adapted to be oriented in encircling relation to a tree trunk, said strap being adjustable in length for securing the framework to the tree trunk.

5. The stand as defined in claim 4, wherein said strap engages the outer ends of said pivotal arms to clamp the pivotal arms against the tree trunk when the strap is tightened.

6. The stand as defined in claim 2, wherein said stabilizer bar includes a pair of telescopic members, means securing the telescopic members in longitudinally adjusted position, one end of the stabilizer bar being connected to said ladder for vertical and horizontal pivotal movement of the stabilizer bar in relation to the ladder, the other end of the stabilizer bar including a saddle adapted to engage a tree trunk, said stabilizer bar being generally horizontally oriented and located at a center region of the vertical height of the ladder.

7. The stand as defined in claim 6, wherein said saddle on the stabilizer bar is adapted to engage the tree trunk at circumferentially spaced points, a flexible strap engaged with the stabilizer bar and adapted to be oriented in encircling relation to the tree trunk, said strap including a hook at each end engaged over the stabilizer bar at its junction with the saddle, said strap being adjustable in length for securing the stabilizer bar to the tree trunk to maintain the ladder section in a stable position in relation to the tree trunk.

8. The stand as defined in claim 1, wherein said brace interconnecting the pivotal safety railing and said seat being telescopic for movement between a locked extended position and a collapsed position.

9. The stand as defined in claim 8, wherein said front rail and side rails of the safety railing are covered with a resilient material to cushion engagement of occupants with the safety railing and enable guns, cameras and the like to be rested against the safety railing without marring the surfaces of such items.

10. The stand as defined in claim 1, wherein said sectional ladder includes telescopic connections between ladder sections, the lowermost ladder section including side stiles extending below a lowermost ladder rung and terminating in a closed tapered pointed end for penetration into the ground until the lowermost ladder rung engages a ground surface for stabilizing the lower end of the ladder.

11. The stand as defined in claim 10, wherein said framework includes pivotal ladder section positioning members mounted at the forward edge of said footrest for positioning the ladder sections on the framework when the framework is utilized as a frame for a cart.

12. The stand as defined in claim 1, wherein said framework includes a rigid axle secured thereto below the rearward edge of the seat and rearwardly of the footrest, said axle having ends projecting laterally from said framework for receiving wheels to support the framework with the seat and footrest generally in a vertically oriented position, said framework including front rails having ends projecting beyond the footrest serving as control handles for rolling the framework along a supporting surface when wheels are mounted on the projecting ends of the axle.

13. The stand as defined in claim 12, wherein the wheels are oriented in close proximity to the center of gravity of the framework to enable a load carried by the framework when used as a cart to be easily balanced.

14. The stand as defined in claim 13, wherein the projecting ends of said front rails of the framework form handles for controlling movement of the framework when used as a cart with the handles adapted to be located at a height generally equal to the height of a pickup load bed to enable the handles to be positioned on the load bed and a game animal easily moved from the cart onto the load bed of the pickup.

15. A multiple use elevated stand and cart comprising a framework including a seat, a footrest mounted below said seat, a ladder connected to said framework below said footrest, a safety railing supported from said framework above said seat, said framework including a supporting structure adapted to be connected to a generally upright support to orient the seat and footrest in generally horizontal positions, said supporting structure including a bracket on a rearward edge portion of said framework, said bracket adapted to be connected to the generally upright support, said bracket on the rearward edge portion of said framework including a pair of laterally spaced and rearwardly extending pivotal arms adapted to engage a surface on the generally upright support at circumferentially spaced points, said bracket on the rearward edge portion of said framework including a saddle rigidly affixed to the rearward edge of said framework and including a pair of diverging members adapted to engage a tree trunk at circumferentially spaced points, said pivotal arms extending beyond the points of engagement of the diverging members with the tree trunk and adapted to engage the tree trunk at circumferentially spaced areas circumferentially outwardly of the diverging members, a flexible strap connected to said framework and adapted to encircle the tree trunk, said strap being adjustable in length for securing the framework to the tree trunk, said strap engaging the outer ends of said pivotal arms to clamp the pivotal arms against a tree trunk when the strap is tightened, said strap being connected to the juncture of the diverging members with the rearward edge of said framework and including a ratchet device for tightening the strap.

16. The stand as defined in claim 15, wherein each of said pivotal arms includes upper and lower members having free ends interconnected by a sleeve, said strap engaged with an outer surface of each sleeve for moving the arms into engagement with the tree trunk.

17. The stand as defined in claim 16, wherein said support structure includes a safety rope connected to the rearward edge of said seat and adopted to be oriented in encircling relation to a tree trunk and crossed in opposed relation to the framework with free ends of the safety rope extending forwardly and downwardly after being crossed for connecting engagement with said framework to serve as an additional anchor for securing the stand to the tree trunk.

* * * * *